United States Patent
Hsieh

(10) Patent No.: US 12,504,376 B2
(45) Date of Patent: *Dec. 23, 2025

(54) BIO-DETECTION DEVICE, BIO-DETECTION SYSTEM, AND BIO-DETECTION METHOD

(71) Applicant: VisEra Technologies Company Limited, Hsin-Chu (TW)

(72) Inventor: Hsin-Yi Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 549 days.

This patent is subject to a terminal disclaimer.

(21) Appl. No.: 17/697,219

(22) Filed: Mar. 17, 2022

(65) Prior Publication Data

US 2023/0296521 A1    Sep. 21, 2023

(51) Int. Cl.
*G01N 21/64* (2006.01)
*G01N 33/48* (2006.01)

(52) U.S. Cl.
CPC ..... *G01N 21/6445* (2013.01); *G01N 21/6452* (2013.01); *G01N 21/6454* (2013.01); *G01N 21/648* (2013.01); *G01N 21/6486* (2013.01); *G01N 33/48* (2013.01); *G01N 2021/6471* (2013.01); *G01N 2021/6478* (2013.01)

(58) Field of Classification Search
CPC .................... G01N 21/6454; G01N 21/6445
See application file for complete search history.

(56) References Cited

U.S. PATENT DOCUMENTS

| | | | |
|---|---|---|---|
| 9,193,998 B2 | 11/2015 | Khurana et al. | |
| 10,901,230 B2 | 1/2021 | Skinner et al. | |
| 2003/0127609 A1* | 7/2003 | El-Hage | G01N 21/6452 |
| | | | 250/574 |
| 2005/0012929 A1 | 1/2005 | Booker et al. | |
| 2019/0170904 A1 | 6/2019 | Topolancik et al. | |

(Continued)

FOREIGN PATENT DOCUMENTS

| | | |
|---|---|---|
| EP | 3985418 A1 | 4/2022 |
| JP | 2010-502996 A | 1/2010 |

(Continued)

OTHER PUBLICATIONS

European Search Report mailed Oct. 21, 2022 in EP Application No. 22175987.1, 10 pages.

(Continued)

*Primary Examiner* — Carolyn Fin
(74) *Attorney, Agent, or Firm* — MUNCY, GEISSLER, OLDS & LOWE, P.C.

(57) ABSTRACT

A bio-detection device is provided. The bio-detection device includes a plurality of pixel units. Each of the pixel units includes a substrate, one or more pairs of reflective sub-polarizing units, and a plurality of reaction sites. The pairs of reflective sub-polarizing units are disposed on the substrate. The difference of the absolute value between respective polarizing angles of the reflective sub-polarizing units in each pair of reflective sub-polarizing units is 90°. The reaction sites are defined above the one or more pairs of reflective sub-polarizing units. The reaction sites and the reflective sub-polarizing units are in one-to-one correspondence.

20 Claims, 12 Drawing Sheets

(56) References Cited

U.S. PATENT DOCUMENTS

2022/0042844 A1  2/2022  Hsieh

FOREIGN PATENT DOCUMENTS

JP  2010-508525 A  3/2010
WO  WO-2004/036284 A1  4/2004

OTHER PUBLICATIONS

Hsin-Yi Hsieh, et al., "Nanowell-Based Orthogonal Submicropolarizer Array Biochip for Multiple Throughput of Fluorescence Sequencing", ACS Applied Nano Materials. 2021, 4, pp. 10409-10418, Published Oct. 6, 2021.
Office Action mailed Jun. 27, 2023 issued in corresponding Japan Application No. 2022-125317 (with English translation), 8 pages.

* cited by examiner

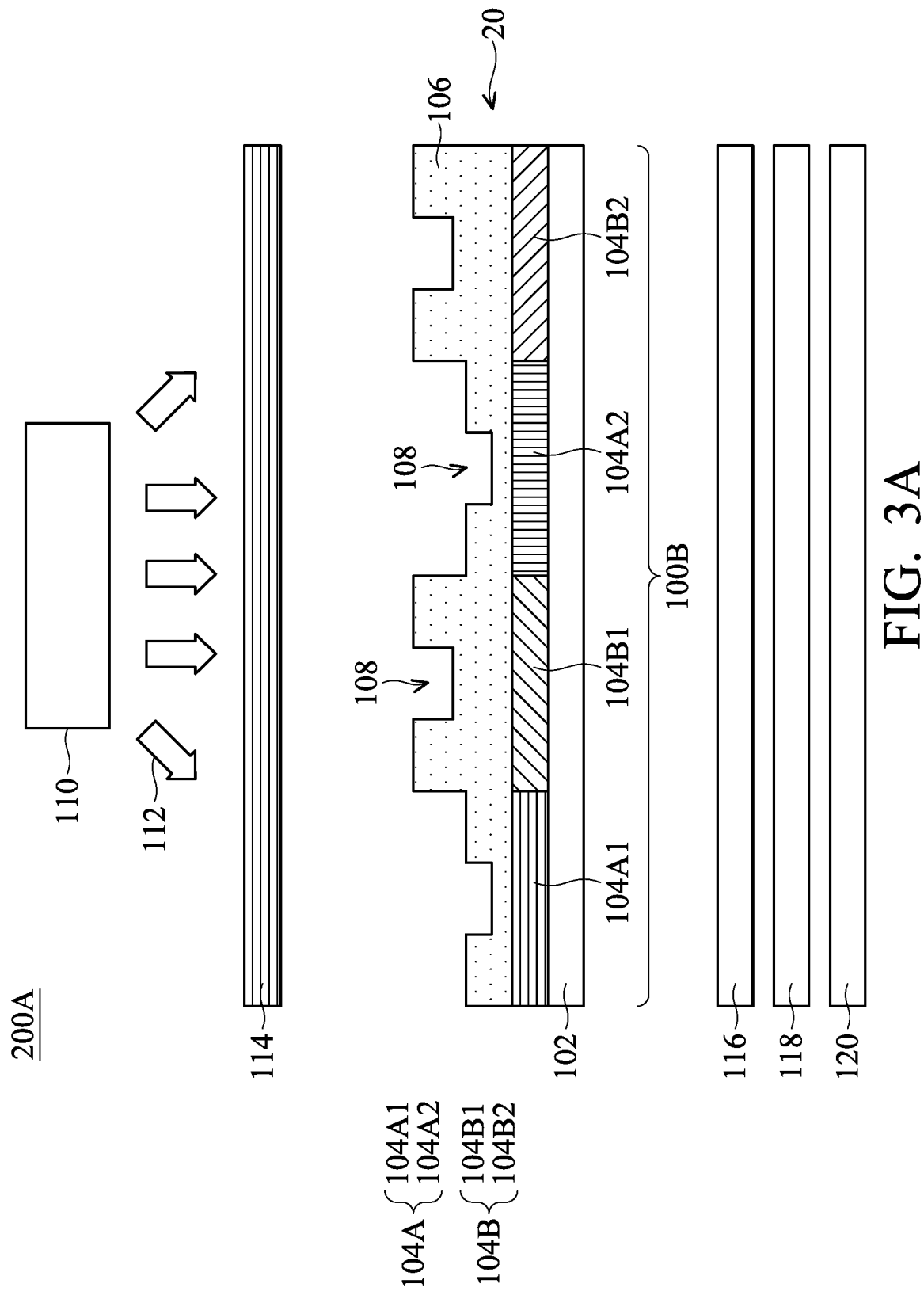

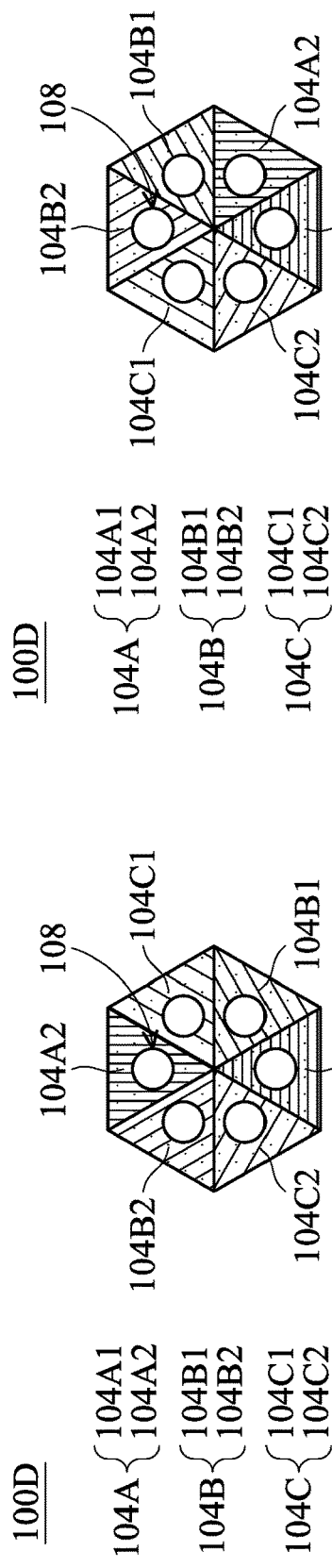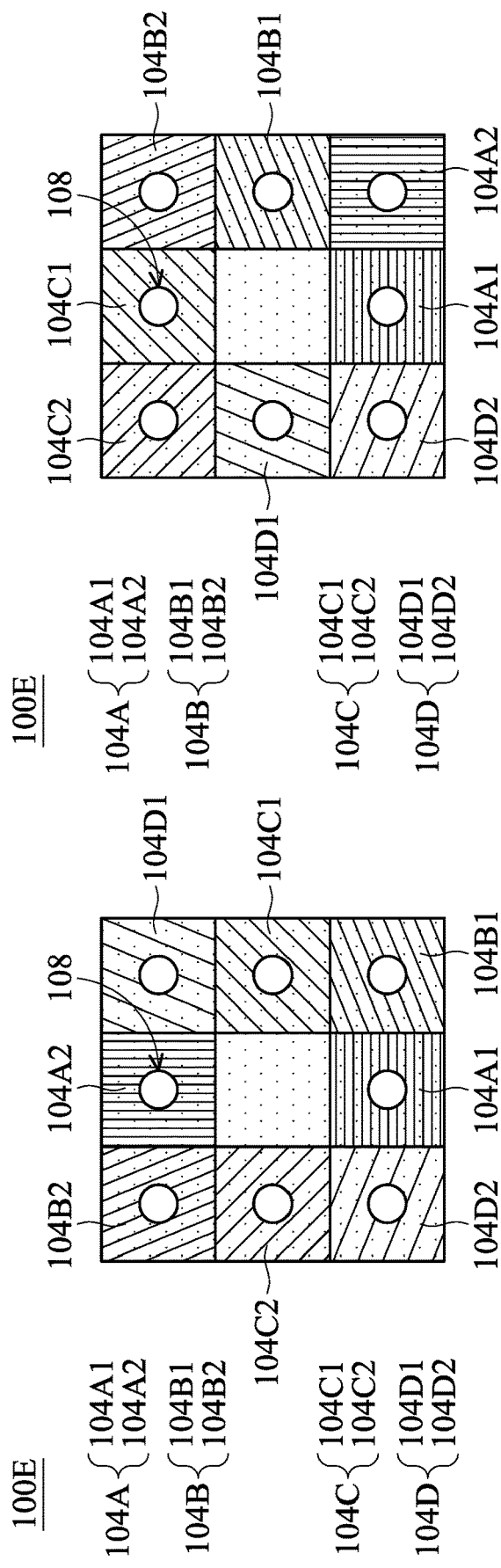

BIO-DETECTION DEVICE, BIO-DETECTION SYSTEM, AND BIO-DETECTION METHOD

BACKGROUND

Technical Field

The present disclosure relates to a bio-detection device, and in particular, it relates to a bio-detection device having reflective sub-polarizing units.

Description of the Related Art

It has recently become common practice for integrated sensing devices to be used for biological analysis. When using such an application, a biological or biochemical sample may be placed on a bio-detection device, such a bio-chip. The bio-reaction or interaction, such as DNA sequencing and immunofluorescence detection, may be reported through the excitation or emission spectrum and/or the intensity of a fluorescent molecule. The fluorescent molecules may be excited by an excitation light with a shorter wavelength and generate an emission light with a longer wavelength toward the photodetector. The spectrum distribution and intensity of the fluorescence may be detected and determined by the photodetector of the bio-detection system. The photodetector may also be incorporated into the bio-detection device to form a bio-sensor, and thus the bio-detection system may not include a photodetector.

In the course of the evolution of bio-detection devices, the density of the pixel array on bio-detection device has generally increased by reduction in spacing or well pitch in order to pursue lower costs and achieve higher throughput. However, such reductions in pixel array size may cause crosstalk between neighboring wells, and each individual fluorescent signal may not be detected precisely, leading to inaccurate analytical results.

Although existing bio-detection devices have been adequate for their intended purposes, they have not been entirely satisfactory in all respects. Therefore, a novel bio-detection device accompanied by a novel bio-detection system and a novel bio-detection method is still in demand.

BRIEF SUMMARY OF THE DISCLOSURE

In accordance with some embodiments of the disclosure, a bio-detection device is provided. The bio-detection device includes a plurality of pixel units. Each of the pixel units includes a substrate, one or more pairs of reflective sub-polarizing units, and a plurality of reaction sites. The one or more pairs of reflective sub-polarizing units are disposed on the substrate. The difference of the absolute value between respective polarizing angles of the reflective sub-polarizing units in each pair of reflective sub-polarizing units is 90°. The reaction sites are defined above the one or more pairs of reflective sub-polarizing units. The reaction sites and the reflective sub-polarizing units are in one-to-one correspondence.

In accordance with some embodiments of the disclosure, a bio-detection system is provided. The bio-detection system includes an excitation light source, a front polarizing element, and the aforementioned bio-detection device. The excitation light source is configured to emit an excitation light. The front polarizing element is configured to polarize the excitation light. The bio-detection device is configured to receive the polarized excitation light.

In accordance with some embodiments of the disclosure, a bio-detection method is provided. The bio-detection method includes the following steps: providing the aforementioned bio-detection system; immobilizing bio-samples on the reaction sites of the bio-detection device; performing a first detecting step to obtain a first fluorescent signal emitted from the bio-samples immobilized on the reaction sites corresponding to first reflective sub-polarizing units of first pairs of reflective sub-polarizing units in the pixel units; performing a second detecting step to obtain a second fluorescent signal emitted from the bio-samples immobilized on the reaction sites corresponding to second reflective sub-polarizing units of the first pairs of reflective sub-polarizing units in the pixel units; and combining the first fluorescent signal and the second fluorescent signal.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIGS. 3A-3B and 4A-4B are cross-sectional views of a bio-detection system in accordance with various embodiments.

FIGS. 5A-5D are top views of a pixel unit having multiple pairs of reflective sub-polarizing units with different arrangements in accordance with various embodiments.

DETAILED DESCRIPTION OF THE DISCLOSURE

Figure 1A:
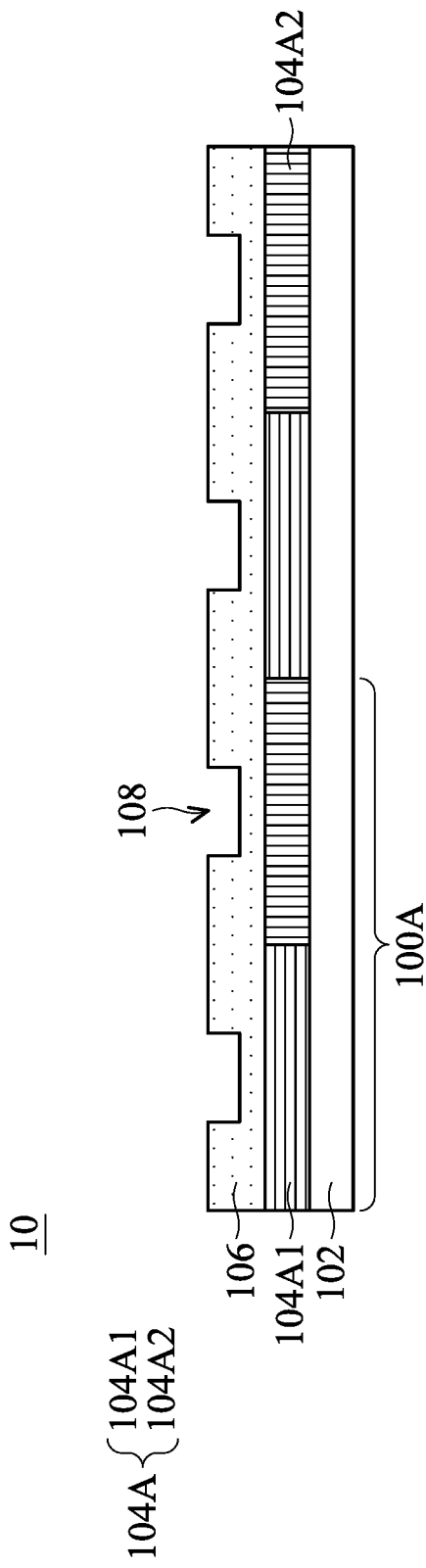
FIGS. 1A, 2A, and 2C are cross-sectional views of a bio-detection device in accordance with various embodiments.

The bio-detection device, the bio-detection system and the bio-detection method of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments.

In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

In addition, the expressions "a layer overlying another layer", "a layer is disposed above another layer", "a layer is disposed on another layer", or "a layer is disposed over another layer" may indicate that the layer is in direct contact with the other layer, or that the layer is not in direct contact with the other layer, there being one or more intermediate layers disposed between the layer and the other layer.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

The terms "about" and "substantially" typically mean+/−10% of the stated value, more typically mean+/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the disclosure, each pixel unit of the bio-detection device includes one or more pair of reflective sub-polarizing units. The difference of the absolute value between respective polarizing angles of the reflective sub-polarizing units in each pair of reflective sub-polarizing units is 90°. The reflective sub-polarizing units in the pixel units may induce reflected diffraction points at the reaction sites on which bio-samples are immobilized, thereby realizing localized enhancement to enable the bio-samples at specific diffraction points to generate sufficient emission light. In addition, according to some embodiments, the bio-detection system includes a front polarizing element that is orientable by rotation to have the same polarizing angle as that of any one of the reflective sub-polarizing units. With such configurations accompanied by a multi-step detecting method, crosstalk between fluorescent signals of neighboring reaction sites may be reduced, and the bio-detection device may be fabricated with higher pixel array density.

Figure 1B:
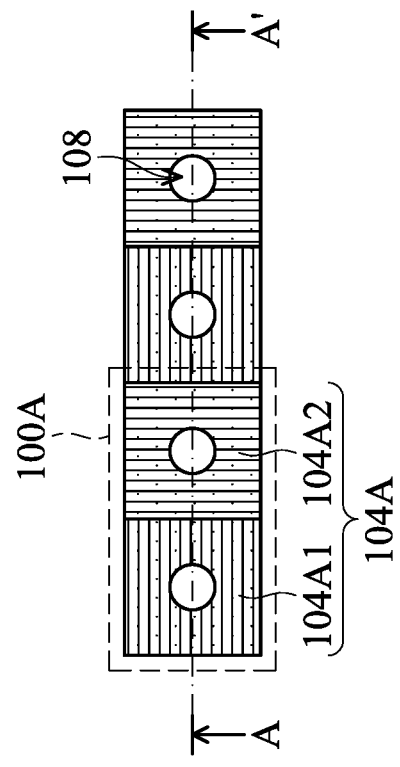
FIGS. 1B, 2B, and 2D are top views of a bio-detection device in accordance with various embodiments.

FIGS. 1A and 1B are a cross-sectional view and a top view of a bio-detection device 10 in accordance with some embodiments. It should be noted that the cross-sectional view of the bio-detection device 10 shown in FIG. 1A is taken along a line A-A' shown in FIG. 1B. Referring to FIGS. 1A and 1B, the bio-detection device 10 includes a plurality of pixel units 100A. The pixel unit 100A defines a 1×2 pixel array. Each pixel unit 100A includes a substrate 102, a first pair of reflective sub-polarizing units 104A, and a plurality of reaction sites 108.

The substrate 102 may include any suitable materials. In some embodiments, the substrate 102 may be a flexible material, such as polyethylene terephthalate (PET), polysulfone (PES), polyimide (PI), polycarbonate (PC), polymethylmethacrylate (PMMA), silicone, epoxy, or a combination thereof. In other embodiments, the substrate 102 may be a rigid material, such as a glass substrate or a sapphire substrate. In addition, in some embodiments, the substrate 102 may be transparent or semi-transparent. More specifically, in the embodiments where the substrate 102 is transparent, the material of the substrate 102 may have a light transmittance to light with a wavelength in a range from 400 nm to 750 nm greater than 85%, or preferably greater than 92%. In the embodiments where the substrate 102 is semi-transparent, the material of the substrate 102 may have a light transmittance to light with a wavelength in a range from 400 nm to 750 nm greater than 25% and less than 85%. In some specific embodiments, the substrate 102 is transparent.

The first pair of reflective sub-polarizing units 104A includes reflective sub-polarizing units 104A1 and 104A2. The term "reflective" used herein means that the sub-polarizing unit may transmit an incident light with the desired polarization and may reflect the rest of the incident instead of absorbing it. The difference of the absolute value between the polarizing angles of the reflective sub-polarizing units 104A1 and 104A2 in the first pair of reflective sub-polarizing units 104A is 90°. The term "polarizing angle" used herein means that the light polarizing at an angle of 90° shift or perpendicular to the polarizing angle cannot pass through the reflective sub-polarizing unit having this polarizing angle. Accordingly, when an incident light (such as an excitation light) polarizing at an angle of 90° shift or perpendicular to the polarizing angle of the reflective sub-polarizing unit, the polarized incident light cannot pass through the reflective sub-polarizing unit, thereby reflecting off the reflective sub-polarizing unit.

According to some embodiments, the reflective sub-polarizing units 104A1 and 104A2 may include a layer of metal wire grating. The metal material of the reflective sub-polarizing units 104A1 and 104A2 may be an opaque material, such as aluminum (Al), gold (Au), silver (Ag), copper (Cu), or a combination thereof. In other embodiments, the reflective sub-polarizing units 104A1 and 104A2 may be a silicon layer that is patterned to form a grating structure. In some embodiments, the grating structure of the reflective sub-polarizing units 104A1 and 104A2 may have a thickness of about 20 nm to about 500 nm. In some embodiments, the grating structure of the reflective sub-polarizing units 104A1 and 104A2 may have a grating period of about 20 nm to about 400 nm. In some embodiments, the grating structure of the reflective sub-polarizing units 104A1 and 104A2 may have a filling ratio (or duty cycle) of about 0.2 to about 0.8.

It should be understood that the reflective sub-polarizing units described in the following embodiments may have similar or the same composition and thickness, which will not be repeated herein.

The orientation of grating ridge mainly affects the transmission percentage of a polarized light. In particular, when the polarized light is parallel, 45° shifted, or 90° shifted, to the orientation of the reflective sub-polarizing unit 104A1 or 104A2, the transmission light intensity after passing through the sub-polarizing units is the maximum, about 50%, or minimum, respectively. Therefore, when the excitation light is a polarized light with 90° shift to the reflective sub-polarizing units, the reflective sub-polarizing units below the reaction sites will block the excitation light from passing through the reflective sub-polarizing units and will reflect the excitation light toward bio-samples on the reaction sites.

In addition to the polarizing angle of the reflective sub-polarizing unit, the extinction ratio of the blocking efficiency may also be affected by the thickness, the grating period, the grating profile, and the filling ratio of the grating structure. It has been simulated in Peng Li et al. "Investigation of achromatic micro polarizer array for polarization imaging in visible-infrared band." Optik, vol 158, April 2018, pp. 1427-1435 that the extinction ratio could reach 104 (equivalent to an optical density (OD) of 4) using aluminum wire with a thickness of 160 nm, a filling ratio of 0.5, and a period of 150 nm. In some embodiments, a light illumination system with an optical density of greater than 3 for blocking the excitation light may be sufficient for bio-sensing applications.

As shown in FIGS. 1A and 1B, according to some embodiments, the reflective sub-polarizing units 104A1 and 104A2 in the first pair of reflective sub-polarizing units 104A may have the same grating period. As shown in FIGS. 1A and 1B, the reflective sub-polarizing units 104A1 and 104A2 are illustrated to have the same line density.

It should be noted that although only one pair of reflective sub-polarizing units 104A is shown to be included in each pixel unit 100A, the disclosure is not limited thereto. In other embodiments, each pixel unit of the bio-detection device may include more than one pair of reflective sub-polarizing units, such as 2, 3, 4, 6, or more pairs of sub-polarizing units, whose configurations will be discussed in detail in the following context and embodiments.

The reaction sites 108 are defined above the first pair of reflective sub-polarizing units 104A. As shown in FIGS. 1A and 1B, the reaction sites 108 and the reflective sub-polarizing units 104A1 and 104A2 are in one-to-one correspondence. That is, there is one reaction site 108 defined above the reflective sub-polarizing unit 104A1, and there is one reaction site 108 defined above the reflective sub-polarizing unit 104A2. In accordance with some embodiments, the reaction sites 108 may be formed as nanowells or nanopatterns. The reaction sites 108 are defined by openings formed in a sample isolation layer 106 that is formed on the first pair of reflective sub-polarizing units 104A. Therefore, the bottom surface of the reaction site 108 is also the bottom surface of the opening formed in the sample isolation layer 106.

In some embodiments, the reaction sites 108 may be modified to enhance bio-sample immobilization. For example, in some embodiments, the sample isolation layer 106 may be coated or treated with self-assembly monolayers (SAMs), functional polymers, or hydrogels for bio-sample immobilization on the reaction sites 108. However, in other embodiments, the sample isolation layer 106 may not be modified. Bio-samples may be immobilized on the reactions sites 108 depending on their weight, size, surface charge, or van der Waals force and so on.

In accordance with some embodiments, the material of the sample isolation layer 106 may be transparent or semi-transparent. More specifically, in the embodiments where the sample isolation layer 106 is transparent, the material of the sample isolation layer 106 may have a light transmittance to light with a wavelength in a range from 400 nm to 750 nm greater than 85%, or preferably greater than 92%. In the embodiments where the sample isolation layer 106 is semi-transparent, the material of the sample isolation layer 106 may have a light transmittance to light with a wavelength in a range from 400 nm to 750 nm greater than 25% and less than 85%.

The material of the sample isolation layer 106 may include metal, metal alloy, metal oxides, metal nitrides, silicon, silicon oxides, silicon nitrides, or a combination thereof. In some embodiments, the metal, metal alloy, metal oxides, metal nitrides may include, but are not limited to, silver (Ag), aluminum (Al), gold (Au), niobium (Nb), titanium (Ti), tungsten (W), an alloy thereof, titanium oxide (e.g., $TiO_2$), tantalum oxide (e.g., $Ta_2O_5$), aluminum oxide (e.g., $Al_2O_3$), niobium oxide (e.g., $Nb_2O_5$), titanium nitride, tantalum nitride, or a combination thereof.

The sample isolation layer 106 may be formed using sputtering, evaporation, spin-coating, chemical vapor deposition (CVD), molecular beam deposition, any other suitable process or a combination thereof. For example, the chemical vapor deposition process may include low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), or a combination thereof.

Figure 2A:
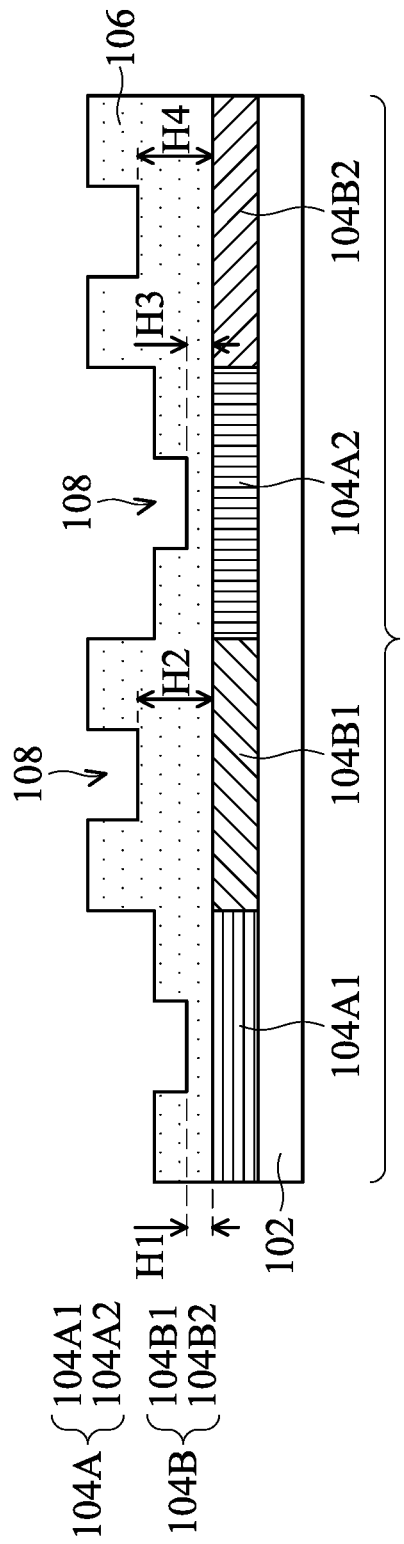
Figure 2B:
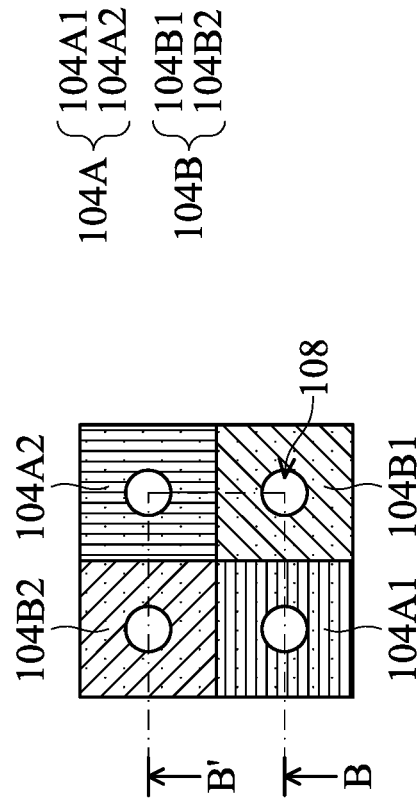

FIGS. 2A and 2B are a cross-sectional view and a top view of a bio-detection device 20 in accordance with some embodiments. The bio-detection device 20 shown in FIGS. 2A and 2B is similar to the bio-detection device 10 shown in FIGS. 1A and 1B, except that the bio-detection device 20 includes a plurality of pixel units 100B, and each pixel units 100B defines a 2×2 pixel array. It should be noted that the cross-sectional view of the bio-detection device 20 shown in FIG. 2A is taken along a line B-B' shown in FIG. 2B.

Referring to FIG. 2A, the pixel unit 100B includes a first pair of reflective sub-polarizing units 104A and a second pair of reflective sub-polarizing units 104B. The first pair of reflective sub-polarizing units 104A includes reflective sub-polarizing units 104A1 and 104A2, and the second pair of reflective sub-polarizing units 104B includes reflective sub-polarizing units 104B1 and 104B2. In some embodiments, as shown in FIG. 2B, the reflective sub-polarizing units 104A1 and 104A2 of the first pair of reflective sub-polarizing units 104A may be disposed on the diagonal line of the pixel unit 100B. Likewise, the reflective sub-polarizing units 104B1 and 104B2 of the second pair of reflective sub-polarizing units 104B may be disposed on another diagonal line of the pixel unit 100B.

The difference of the absolute value between the polarizing angles of the reflective sub-polarizing units 104A1 and 104A2 in the first pair of the reflective sub-polarizing units 104A is 90°. The difference of the absolute value between the polarizing angles of the reflective sub-polarizing units 104B1 and 104B2 in the second pair of the reflective sub-polarizing units 104B is 90°. Furthermore, according to some embodiments, as shown in FIGS. 2A and 2B, all of the reflective sub-polarizing units 104A1, 104A2, 104B1, and 104B2 in the pixel units 100B may have different respective polarizing angles.

In addition, in some embodiments, two of the reflective sub-polarizing units in the same pair of reflective sub-polarizing units may have the same grating period. Specifically, the reflective sub-polarizing units 104A1 and 104A2 in the first pair of reflective sub-polarizing units 104A have the same grating period (as shown in FIGS. 2A and 2B to have the same line density), and the reflective sub-polarizing units 104B1 and 104B2 in the second pair of reflective sub-polarizing units 104B have the same grating period (as shown in FIGS. 2A and 2B to have the same line density). However, in some embodiments, the reflective sub-polarizing units in different pairs of reflective sub-polarizing units may have different grating periods. Specifically, the reflective sub-polarizing units 104A1 and 104A2 in the first pair of reflective sub-polarizing units 104A have a different grating period than the reflective sub-polarizing units 104B1 and 104B2 in the second pair of reflective sub-polarizing units 104B (as shown in FIGS. 2A and 2B to have different line density).

Additionally, according to some embodiments, the reaction sites 108 corresponding to the reflective sub-polarizing units in the same pair of reflective sub-polarizing units may have the same height. As shown in FIG. 2A, the height of the reaction site 108 as referred to herein is measured from the top surface of the reflective sub-polarizing unit to the bottom surface of the reaction site 108. In FIG. 2A, the reflective sub-polarizing units 104A1 and 104A2 in the first pair of reflective sub-polarizing units 104A may respectively have heights H1 and H3. The height H1 and the height H3 are the same. Similarly, the reflective sub-polarizing units 104B1 and 104B2 in the second pair of reflective sub-polarizing units 104B may respectively have heights H2 and H4. The height H2 and the height H4 are the same. However, according to some embodiments, the reaction sites 108 corresponding to the reflective sub-polarizing units in different pairs of reflective sub-polarizing units may have different heights. For example, in FIG. 2A, the heights H1 and H3 of the reflective sub-polarizing units 104A1 and 104A2 in the first pair of reflective sub-polarizing units 104A are different from the heights H2 and H4 of the reflective sub-polarizing units 104B1 and 104B2 in the second pair of reflective sub-polarizing units 104B.

The location of the reflected diffraction points induced by the reflective sub-polarizing unit may depend on the pitch between the reflective sub-polarizing units, the period of grating of the reflective sub-polarizing unit, excitation light wavelength, and excitation light angle, and the height of the reaction sites, which receives bio-samples, may be adjusted to enable the bio-samples to be placed at the reflected diffraction points. Accordingly, local enhancement of the excitation light at the reaction sites may be accomplished. Meanwhile, bio-samples immobilized on the reaction sites 108 that is not located at the reflected diffraction points are not irradiated or are less irradiated, and accordingly the emission light from those bio-samples are weak. As such, crosstalk between fluorescent signals from the neighboring reaction sites may be reduced.

In addition, the material, the fill factor (i.e., the ratio of the grating width to the grating period), or the depth of the grating structure of the reflective sub-polarizing unit may affect the diffraction efficiency of the excitation light that reflects off the reflective sub-polarizing unit. In order to achieve better local enhancement, the material, the fill factor, or the depth of the grating structure of the reflective sub-polarizing unit may be tuned. However, those factors for the grating structure of the reflective sub-polarizing unit are not particularly limited in the present disclosure as long as the reaction sites are located at the reflected diffraction point.

Figure 2C:
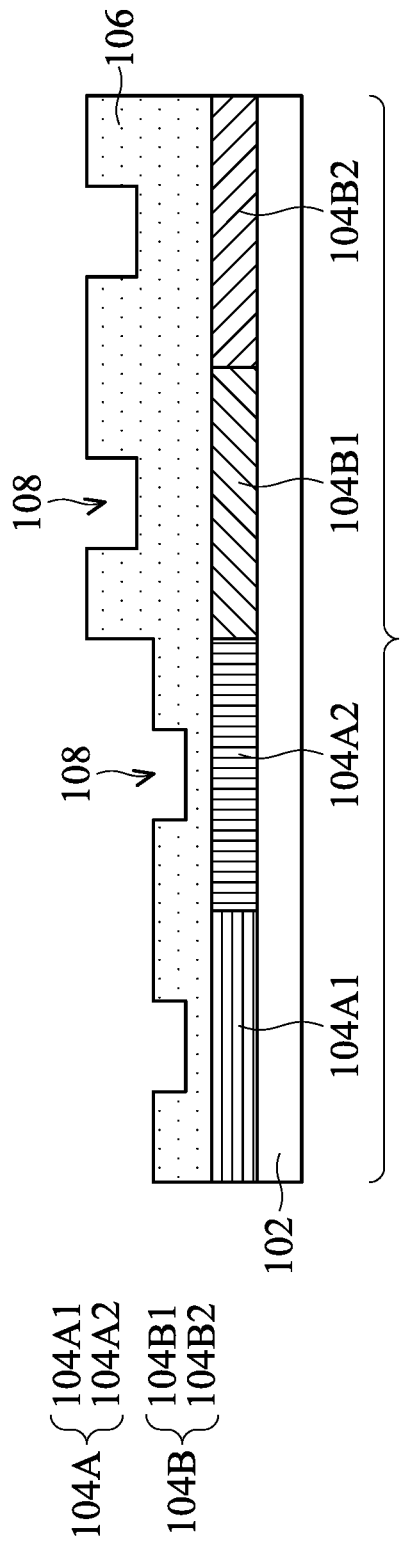
Figure 2D:
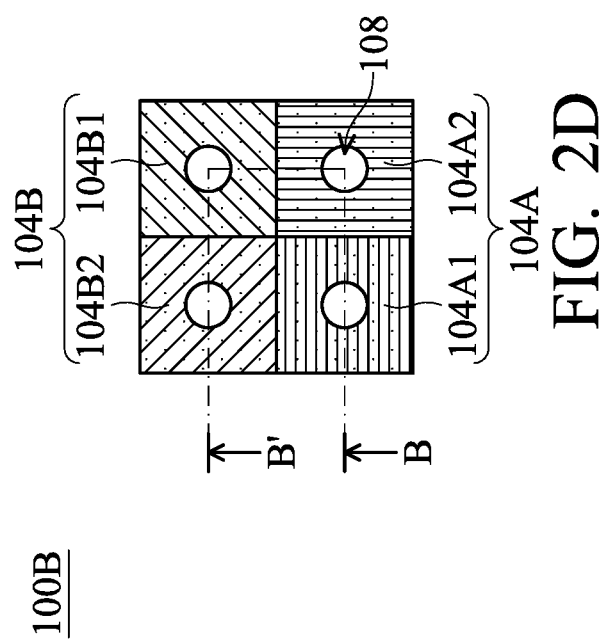

FIGS. 2C and 2D are a cross-sectional view and a top view of a bio-detection device 30 in accordance with some embodiments. The bio-detection device 30 shown in FIGS. 2C and 2D is similar to the bio-detection device 20 shown in FIGS. 2A and 2B, except that the arrangement of the first pair and the second pair of reflective sub-polarizing units 104A and 104B in the bio-detection devices 20 and 30 is different. In particular, in some embodiments, as shown in FIGS. 2C and 2D, the reflective sub-polarizing units 104A1 and 104A2 of the first pair of the reflective sub-polarizing units 104A adjoin each other, and the reflective sub-polarizing units 104B1 and 104B2 of the second pair of the reflective sub-polarizing units 104B adjoin each other. It should be appreciated that the arrangement of the reflective sub-polarizing units 104A1, 104A2, 104B1, and 104B2 is not particularly limited to that shown in FIG. 2D as long as the reflective sub-polarizing units in the same pair of reflective sub-polarizing units adjoin each other.

Likewise, as described above and shown in FIG. 2C, in these embodiments, the reaction sites 108 corresponding the reflective sub-polarizing units 104A1 and 104A2 in the first pair of the reflective sub-polarizing units 104A or corresponding to the reflective sub-polarizing units 104B1 and 104B2 in the second pair of the reflective sub-polarizing units 104B may have the same height.

FIG. 3A is a cross-sectional view of a bio-detection system 200A in accordance with some embodiments. Referring to FIG. 3A, the bio-detection system 200A includes an excitation light source 110, a front polarizing element 114, and the bio-detection device 20. Although FIG. 3A illustrates that the bio-detection device 20 is included in the bio-detection system 200A, it should be understood that any one of the bio-detection devices 10, 20, and 30 described in the embodiments with reference to the above figures may be adopted and included in the bio-detection system 200A, or may be adopted and included in other bio-detection systems discussed in other embodiments with reference to the following figures.

The excitation light source 110 is configured to emit an excitation light 112. In some embodiments, the excitation light source 110 may include a plurality of sub-excitation light sources (not shown), and each of the sub-excitation light sources may emit an excitation light with one excitation light wavelength. In some embodiments, the sub-excitation light sources may emit multiple excitation lights with various excitation light wavelengths in turns. For example, the sub-excitation light sources with different excitation light wavelengths may emit excitation lights sequentially. Alternatively, the sub-excitation light sources may emit excitation lights in groups. In some embodiments, the excitation light source 110 is a monochromator that continuously emits lights from a short wavelength to a long one (or from a long wavelength to a short one). For example, the monochromator may emit lights with wavelengths ranging from about 200 nm to about 1000 nm.

The front polarizing element 114 is configured to polarize the excitation light 112 emitted from the excitation light source 110. Accordingly, the bio-detection device 20 may receive the excitation light 112 that is polarized by the front polarizing element 114. According to some embodiments, the front polarizing element 114 may be orientable by rotation so that the front polarizing element 114 may has a polarizing angle that is the same as the polarizing angle of any of the reflective sub-polarizing units of the one or more pairs of reflective sub-polarizing units in each of the pixel units. For example, the front polarizing element 114 may be oriented to have a polarizing angle that is the same as that of the reflective sub-polarizing unit 104A1 so that the polarized excitation light can pass through the reflective sub-polarizing unit 104A1 but cannot completely pass through the reflective sub-polarizing units 104A2, 104B1, and 104B2. Therefore, the rest of the polarized excitation light that does not pass through the reflective sub-polarizing units may reflect off the reflective sub-polarizing units towards bio-samples located in the reaction sites 108 corresponding to these reflective sub-polarizing units and may irradiate the bio-samples. Furthermore, the reflected polarized excitation light may produce reflected diffraction points at the reaction sites whose height is adjusted to enable the bio-samples immobilized on these reaction sites to receive the reflected polarized excitation light with higher intensity.

Referring again to FIG. 3A, in some embodiments, the bio-detection system 200A may further include a lens 116, a photodetector 120, and a filter element 118. The lens 116 may be any suitable optical lens. In some embodiments, the lens 116 may be a focus-tunable lens that may be adjusted to a focus at a specific height. Accordingly, the emission light from bio-samples immobilized on the reaction sites only corresponding to one pair of the reflective sub-polarizing units may be collected each time after the bio-samples are illuminated by the polarized excitation light passing through the front polarizing element 114 that is oriented to have the same polarizing angle as either one in the pair of the reflective sub-polarizing units below the reaction sites. Furthermore, the reaction sites may have the same height as the focus of the focus-tunable lens.

For examples, when the front polarizing element 114 is oriented to have the same polarizing angle as the reflective sub-polarizing unit 104A1 and the lens 116 is adjusted to a focus at the height H1 or H3 shown in FIG. 2A, only the emission signals from the bio-samples immobilized on the reaction sites 108 corresponding to the reflective sub-polarizing units 104A2 will be collected. The emission signals from the bio-samples immobilized on the reaction sites 108 corresponding to the second pair of reflective sub-polarizing units 104B will not be collected because the height H1 or H3 where the focus of the focus-tunable lens is located is different from the height H2 or H4 shown in FIG. 2A where the emission signals from bio-samples immobilized on the reactions sites of the second pair of reflective sub-polarizing units 104B occur.

The photodetector 120 may be configured to detect the emission light. The photodetector 120 may be a photodiode, or any suitable light sensing component that can convert measured light into current signals. In the embodiments where the photodetector 120 is a photodiode, the photodetector 120 may be connected to a source and a drain of a metal-oxide-semiconductor (MOS) transistor (not shown) that may transfer the current to another components, such as another MOS transistor. The another component may include, but is not limited to, a reset transistor, a current source follower or a row selector for transforming the current into digital signals.

According to some embodiments, the filter element 118 may be a rejection filter that may filter the excitation light from entering the photodetector 120. In some embodiments, the filter element 118 may be disposed in the optical path between the lens 116 and the photodetector 120 as shown in FIG. 3A, but the disclosure is not limited thereto. In other embodiments, the filter element 118 may also be disposed in the optical path between the bio-detection device 20 and the lens 116. In some embodiments, the filter element 118 may include an absorption filter, an interference filter, a plasmonic metasurface structure, a dielectric metasurface structure, or a combination thereof.

According to the embodiments of the disclosure, the bio-detection system includes the aforementioned bio-detection device and a front polarizing element. The bio-detection device in the bio-detection system includes one or more pairs of reflective sub-polarizing units. The difference of the absolute value between respective polarizing angles of the reflective sub-polarizing units (for example, the reflective sub-polarizing units 104A1 and 104A2 or the reflective sub-polarizing units 104B1 or 104B2 shown in FIG. 3A) in each pair of reflective sub-polarizing units (for example, the first pair of reflective sub-polarizing units 104A or the second pair of reflective sub-polarizing units 104B shown in FIG. 3A) is 90°. Additionally, the front polarizing element may be orientable by rotation so that the front polarizing element may has a polarizing angle that is the same as the polarizing angle of any of the reflective sub-polarizing units of the one or more pairs of reflective sub-polarizing units in each of the pixel units. Moreover, when each pixel unit includes more than one pair of reflective sub-polarizing units, a focus-tunable lens, whose focus can be adjusted to a specific height, may be used to collect the emission light from bio-samples immobilized to the reaction sites only corresponding to one pair of reflective sub-polarizing units each time. The reaction sites corresponding to the pair of reflective sub-polarizing units have the same height as the focus of the focus-tunable lens. In this way, the bio-detection system may sequentially detect bio-samples immobilized to reaction sites with different heights corresponding to different reflective sub-polarizing units, and the fluorescent signals generated from the bio-samples may be combined to obtain a complete and accurate analytical result. Accordingly, crosstalk between neighboring reaction sites in each image may be reduced for better spatial resolution, and the bio-detection device may be fabricated with higher pixel array density.

Figure 3B:
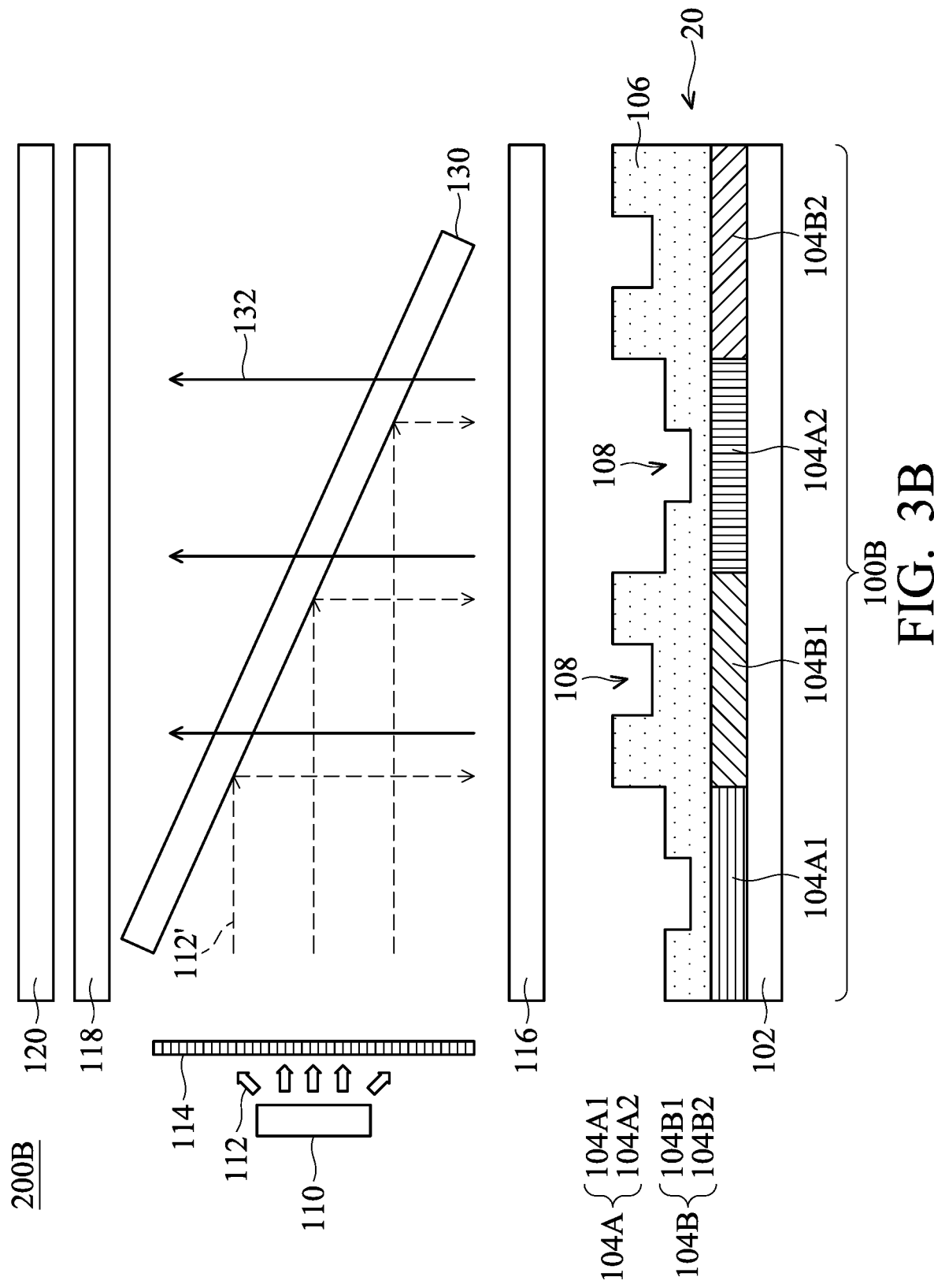

Next, referring to FIG. 3B, FIG. 3B is a cross-sectional view of a bio-detection system 200B in accordance with some embodiments. The bio-detection system 200B shown in FIG. 3B is similar to the bio-detection system 200A shown in FIG. 3A, except that the bio-detection system 200B uses reflective apparatus to direct the excitation light toward the bio-detection device 20.

As shown in FIG. 3B, in some embodiments, the bio-detection system 200B may further include a light splitting element 130 as the reflective apparatus that may direct the excitation light toward the bio-detection device 20. According to some embodiments, the light splitting element 130 may be disposed in the optical path between the lens 116 and the filter element 118. In some embodiments, the light splitting element 130 may include a dichroic filter (i.e. an interference filter) with a reflection property for a short wavelength less than 580 nm and a transmission property for long wavelength greater than 580 nm. The cutoff wavelength for reflection and transmission may be changed based on the excitation and emission properties of fluorescent molecules.

Owing to the light spectrum difference between the polarized excitation light 112' and the emission light 132 from bio-samples, the light splitting element 130 may allow the polarized excitation light 112' to reflect toward the bio-detection device 20, and may allow the emission light 132 to pass through. According to some other embodiments, the light splitting element 130 may include a beam splitter with a splitting ratio of 50/50, but the present disclosure is not limited thereto. In some further embodiments, the light splitting element 130 may also be a beam splitter with a splitting ratio other than 50/50, such as 60/40 or 70/30. In some embodiments, the beam splitter may be a cube beam splitter, a plate beam splitter, or a pellicle beam splitter.

In addition, in the embodiments shown in FIG. 3B, the front polarizing element 114 is disposed in the optical path between the excitation light source 110 and the light splitting element 130, but the disclosure is not limited thereto. In accordance with the other embodiments, the front polarizing element 114 may be disposed in the optical path between the lens 116 and the bio-detection device 20 (not shown).

Figure 4A:
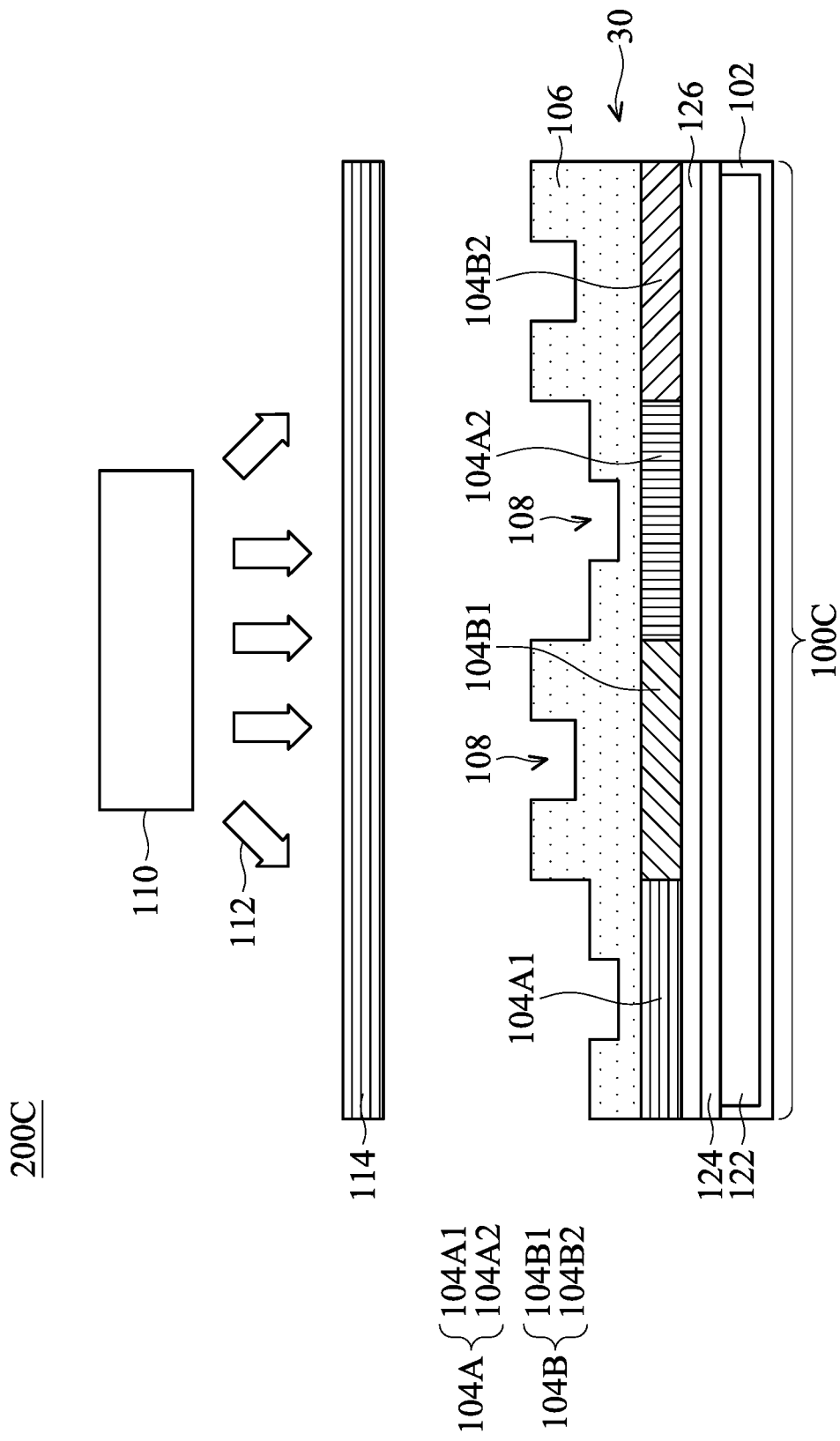
Figure 4B:
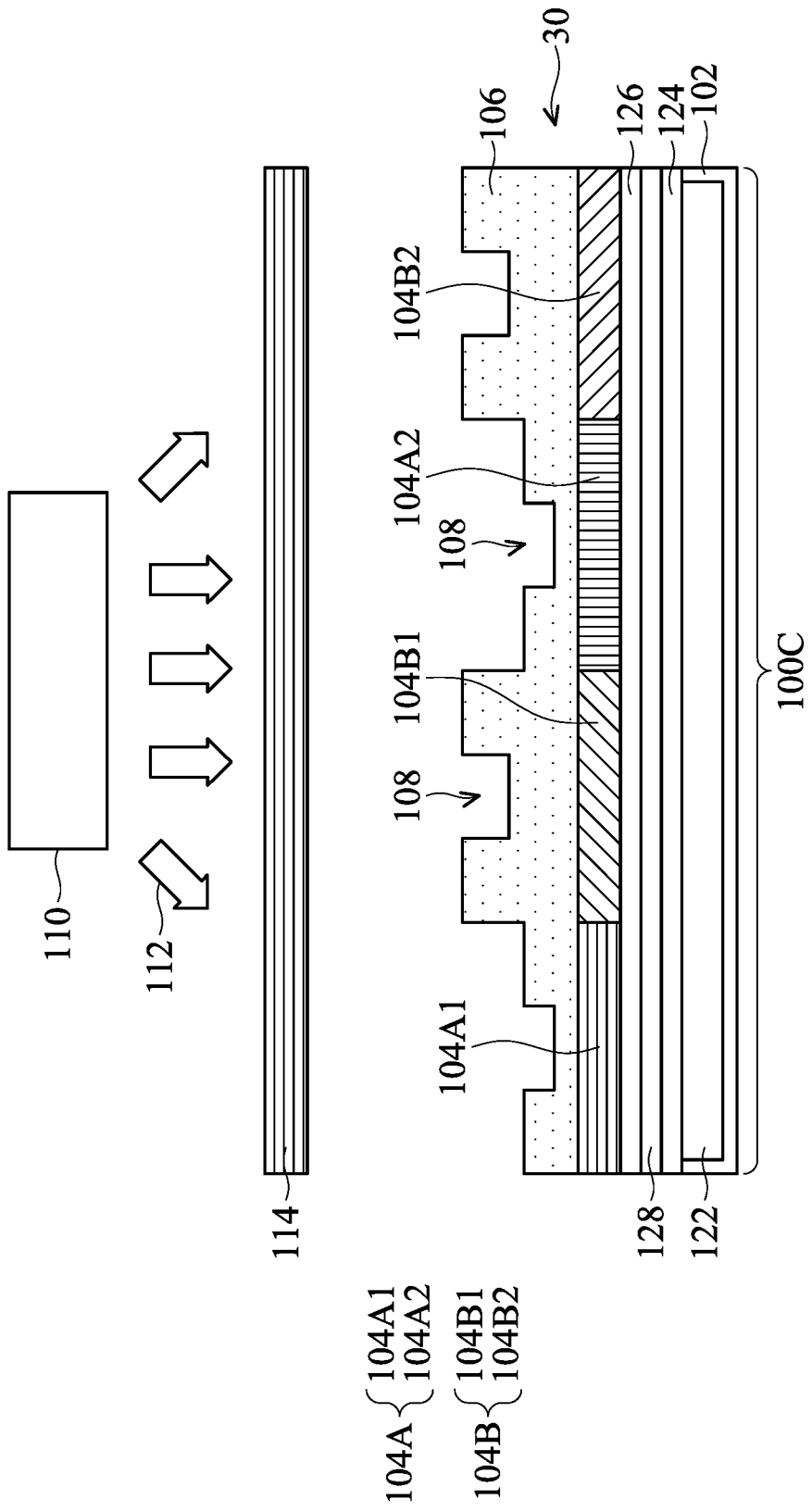

FIGS. 4A-4B are cross-sectional views of a bio-detection system 200C in accordance with various embodiments. Referring to FIG. 4A, the bio-detection system 200C shown in FIG. 4A is similar to the bio-detection system 200A shown in FIG. 3A, except that the lens, the photodetector and the filter element are incorporated into a bio-detection device 30. As shown in FIG. 4A, in some embodiments, in addition to those elements of the bio-detection device 10 or 20 shown in the aforementioned embodiments, each pixel unit 100C of the bio-detection device 30 may further include a photodiode 122, a filter layer 124, and a lens 126. The photodiode 122 is embedded in the substrate 102. The filter layer 124 is disposed on the photodiode 122. The lens 126 is disposed between the filter layer 124 and the first and second pairs of reflective sub-polarizing units 104A and 104B. The function and the material of the photodiode 122, the filter layer 124, and the lens 126 of the bio-detection device 30 are respectively similar to or the same as the photodetector 120, the filter element 118, and the lens 116 of the bio-detection system 200A in FIG. 3A, and accordingly are not repeated herein.

In addition, in some embodiments, the lens 126 of the bio-detection device 30 may be a focus-tunable lens. For example, the focus-tunable lens may be an acoustic tunable lens, a liquid curvature tunable lens, or an electrically tunable lens whose focal length can be adjusted in a mechanical, fluidic, or electrical manner. That is, the focus-tunable lens is an optical element being adapted to modify a focal position of a light beam passing through the focus-tunable lens in a controllable fashion. The acoustic tunable lens is an adaptive optical element filled with a fluid and driven by acoustic wave, and the electrically tunable lens is an adaptive optics feature filled with a fluid as well but driven by applying different electrical signals.

Referring to FIG. 4B, according to some embodiments, each pixel unit 100C of the bio-detection device 30 may further include an optical absorption layer 128. The optical absorption layer 128 is disposed between the filter layer 124 and the lens 126. According to some embodiments, the optical absorption layer 128 may include an absorption filter. When the filter layer 124 is a reflective filter instead of an absorption filter, the optical absorption layer 128 may be further configured above the filter layer 124 to absorb the rest of the excitation light reflecting off the filter layer 124. In addition, the optical absorption layer 128 is designed not to absorb the emission light (or fluorescent signals) generated from bio-samples after irradiated.

FIGS. 5A-5D are top views of pixel units 100D and 100E having multiple pairs of reflective sub-polarizing units with different arrangements in accordance with various embodiments. Referring to FIG. 5A, the pixel unit 100D in FIG. 5A is similar to the pixel unit 100A in FIG. 1A or the pixel unit 100B in FIG. 2A, except that the pixel unit 100D includes 3 pairs of reflective sub-polarizing units, namely a first pair of reflective sub-polarizing units 104A, a second pair of reflective sub-polarizing units 104B, and a third pair of reflective sub-polarizing units 104C.

As shown in FIG. 5A, according to some embodiments, the first pair of reflective sub-polarizing units 104A includes reflective sub-polarizing units 104A1 and 104A2 that are disposed opposite to each other. The second pair of reflective sub-polarizing units 104B includes reflective sub-polarizing units 104B1 and 104B2 that are disposed opposite to each other. The third pair of reflective sub-polarizing units 104C includes reflective sub-polarizing units 104C1 and 104C2 that are disposed opposite to each other. The difference of the absolute value between respective polarizing angles of the reflective sub-polarizing units in the same pair of reflective sub-polarizing units is 90°. For example, the difference of the absolute value between respective polarizing angles of the reflective sub-polarizing units 104A1 and A2 is 90°, the difference of the absolute value between respective polarizing angles of the reflective sub-polarizing units 104B1 and B2 is 90°, and the difference of the absolute value between respective polarizing angles of the reflective sub-polarizing units 104C1 and C2 is 90°.

Furthermore, in some embodiments, two of the reflective sub-polarizing units in the same pair of reflective sub-polarizing units may have the same grating period. For example, as shown by the line density in FIG. 5A, the reflective sub-polarizing units 104A1 and A2 have the same grating period (i.e., the same line density in FIG. 5A), the reflective sub-polarizing units 104B1 and B2 have the same grating period (i.e., the same line density in FIG. 5A), and the reflective sub-polarizing units 104C1 and C2 have the same grating period (i.e., the same line density in FIG. 5A).

Additionally, as described above, in some embodiments, the reaction sites 108 corresponding to the reflective sub-polarizing units in the same pair of reflective sub-polarizing units may have the same height. For example, the reaction sites 108 corresponding to the reflective sub-polarizing units 104A1 and A2 may have the same height, the reaction sites 108 corresponding to the reflective sub-polarizing units 104B1 and B2 may have the same height, and the reaction sites 108 corresponding to the reflective sub-polarizing units 104C1 and C2 may have the same height.

In some embodiments, the reaction sites 108 corresponding to the reflective sub-polarizing units in different pairs of reflective sub-polarizing units may have different heights. For example, the reaction sites 108 corresponding to the reflective sub-polarizing unit 104A1 may have a different height than the reaction sites 108 corresponding to the reflective sub-polarizing unit 104B1, 104B2, 104C1, and 104C2, the reaction sites 108 corresponding to the reflective sub-polarizing unit 104B1 may have a different height than the reaction sites 108 corresponding to the reflective sub-polarizing unit 104A1, 104A2, 104C1, and 104C2, and the reaction sites 108 corresponding to the reflective sub-polarizing unit 104C1 may have a different height than the reaction sites 108 corresponding to the reflective sub-polarizing unit 104A1, 104A2, 104B1, and 104B2.

According to some embodiments, the reflective sub-polarizing units may be arranged in a clockwise direction to have a polarizing angle that is 30° shift to that of the previous one. As shown in FIG. 5A, the reflective sub-polarizing unit 104C2 may have a polarizing angle that is 30° shift to the polarizing angle of the reflective sub-polarizing unit 104A1. The reflective sub-polarizing unit 104B2 may have a polarizing angle that is 30° shift to the polarizing angle of the reflective sub-polarizing unit 104C2. The reflective sub-polarizing unit 104A2 may have a polarizing angle that is 30° shift to the polarizing angle of the reflective sub-polarizing unit 104B2. However, the present disclosure is not limited thereto.

In other embodiments, the reflective sub-polarizing units in the same pair of reflective sub-polarizing units may be disposed to adjoin each other. As shown in FIG. 5B, the reflective sub-polarizing units 104A1 and 104A2 in the first pair of reflective sub-polarizing units 104A are disposed to adjoin each other, the reflective sub-polarizing units 104B1 and 104B2 in the second pair of reflective sub-polarizing units 104B are disposed to adjoin each other, and the reflective sub-polarizing units 104C1 and 104C2 in the second pair of reflective sub-polarizing units 104C are disposed to adjoin each other. By disposing the reflective sub-polarizing units in the same pair of reflective sub-polarizing units in close proximity to each other, which have the same height, the fabricating process may be less complex.

Next, referring to FIGS. 5C and 5D, the pixel unit 100E shown in FIGS. 5C and 5D is similar to the pixel unit 100D shown in FIGS. 5A and 5B, except that the pixel unit 100E includes 4 pairs of reflective sub-polarizing units, namely the first pair of reflective sub-polarizing units 104A, the second pair of reflective sub-polarizing units 104B, the third pair of reflective sub-polarizing units 104C, and a fourth pair of reflective sub-polarizing units 104D. Likewise, in some embodiments, as shown in FIG. 5C, the reflective sub-polarizing units may be arranged in a clockwise direction to have a polarizing angle that is 22.5° shift to that of the previous one. In other embodiments, as shown in FIG. 5D, the reflective sub-polarizing units in the same pair of reflective sub-polarizing units may be disposed to adjoin each other. The arrangement principle of the reflective sub-polarizing units in the embodiments shown in FIGS. 5C and 5D is similar to that in the embodiments shown in FIGS. 5A and 5B, which is not repeated in detail herein.

In addition, in FIGS. 5C and 5D, according to some embodiments, the space of the pixel unit 100E in which the reflective sub-polarizing units are not disposed may be filled with the aforementioned sample isolation layer, and no reaction site is formed accordingly.

Figure 6A:
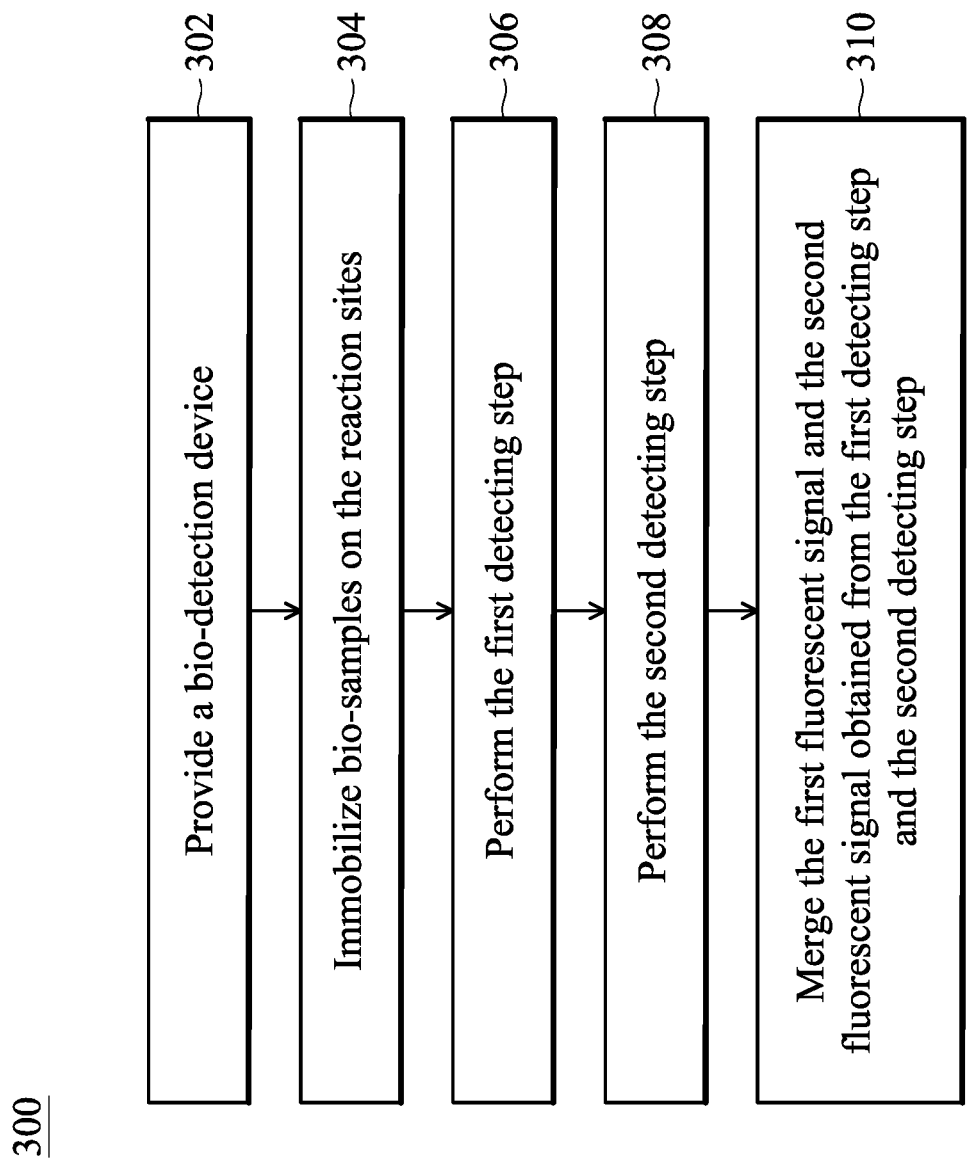
FIG. 6A is a flow diagram of a bio-detection method in accordance with some embodiments.
Figure 6B:
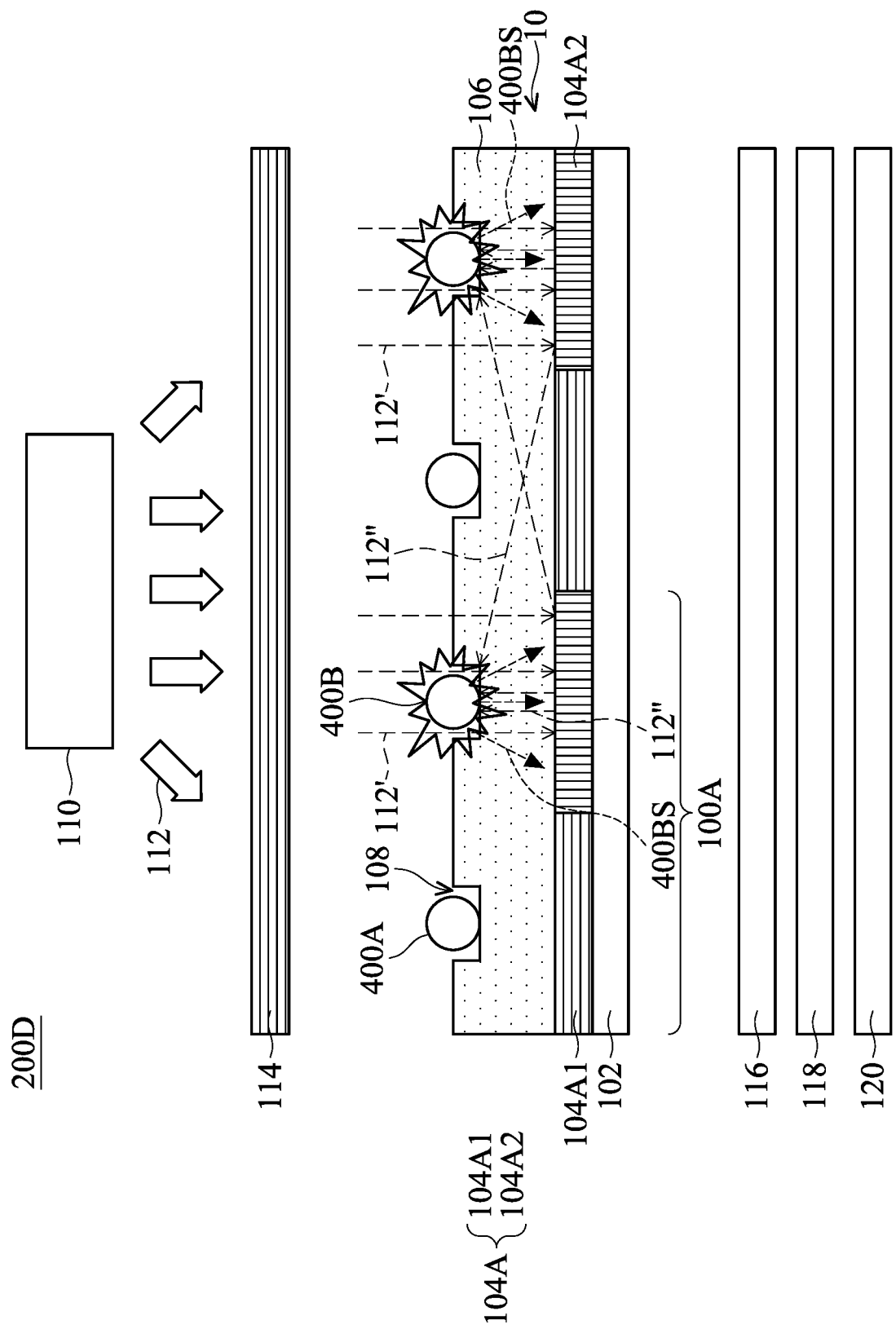
FIGS. 6B and 6C illustrate the detection of bio-samples using a bio-detection system in accordance with some embodiments.
Figure 6C:
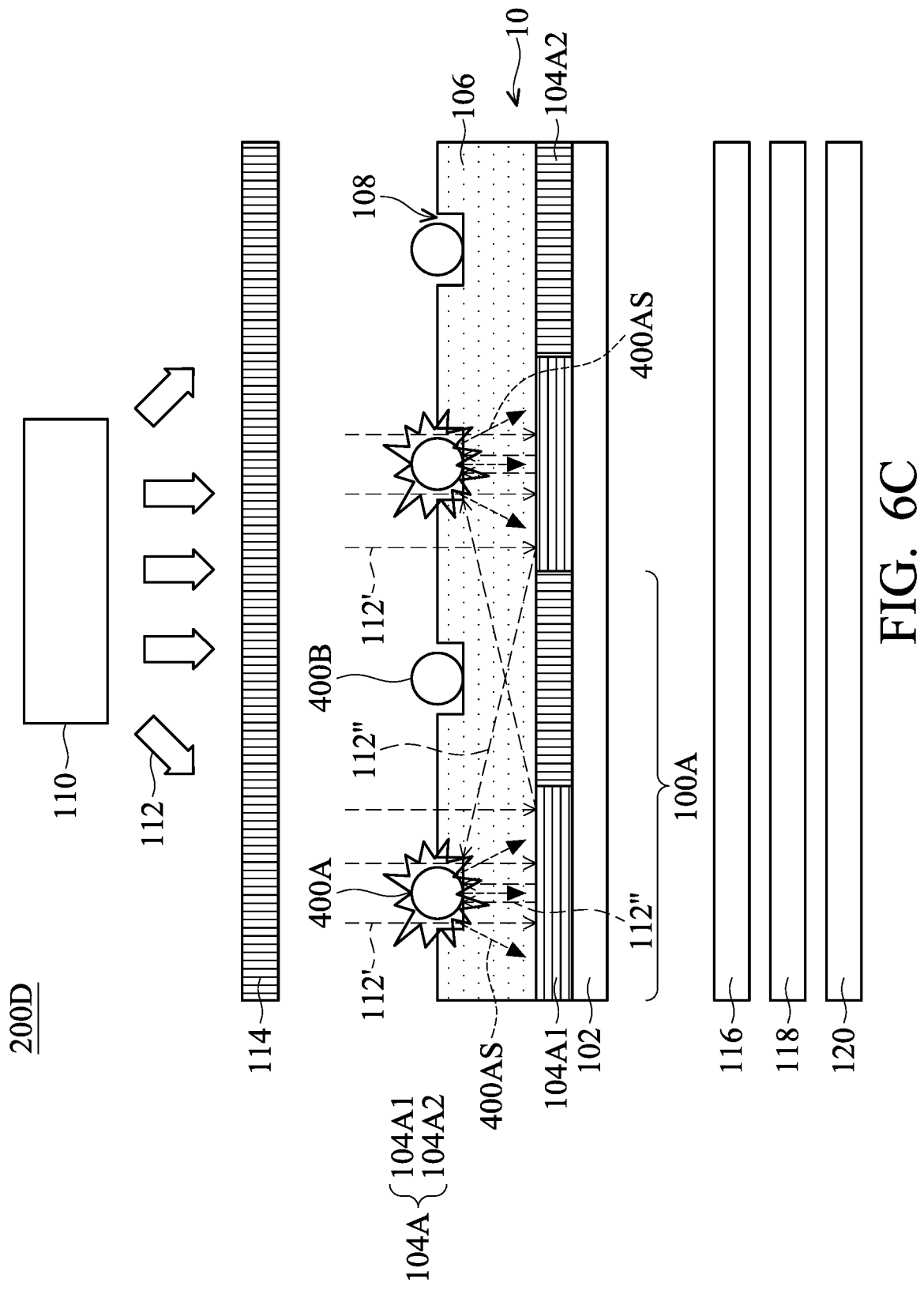

FIG. 6A is a flow diagram of a bio-detection method 300 in accordance with some embodiments, and FIGS. 6B and 6C illustrate the detection of bio-samples 400A and 400B using a bio-detection system 200D in accordance with some embodiments. Referring to FIGS. 6A-6C, the bio-detection method 300 is a two-step detecting method using the bio-detection system 200D in FIGS. 6B and 6C in which the bio-detection device 10 is included.

The bio-detection method 300 starts with step 302 to provide the bio-detection device 10 that will be used in the bio-detection system 200D. Next, referring to step 304 of FIG. 6A and FIG. 6B, the bio-samples 400A and 400B are immobilized on the reaction sites 108. In particular, an appropriate amount of solution containing bio-samples is applied to the bio-detection device 10. After the solution containing the bio-samples is dried, excess residues of the bio-samples are removed from the region other than the reaction sites 108, and the bio-samples may be immobilized on each reaction site 108. In FIG. 6B, the bio-samples 400A refer to the bio-samples immobilized on the reactions sites 108 corresponding to the reflective sub-polarizing unit 104A1 of the first pair of reflective sub-polarizing unit 104A in the pixel unit 100A, and the bio-samples 400B refer to the bio-samples immobilized on the reactions sites 108 corresponding to the reflective sub-polarizing unit 104A2 of the first pair of reflective sub-polarizing unit 104A in the pixel unit 100A.

In some embodiments, the bio-samples 400A and 400B may include, but is not limited to, biomolecules, chemical molecules, or a combination thereof. In some embodiments, the biomolecules may include, but is not limited to, DNA, RNA, proteins, or a combination thereof. In accordance with some embodiments, the bio-samples 400A and 400B may be analyzed to determine a gene sequence, DNA-DNA hybridization, single nucleotide polymorphisms, protein interactions, peptide interactions, antigen-antibody interactions, glucose monitoring, cholesterol monitoring, and the like.

Next, referring to step 306 of FIG. 6A and FIG. 6B, the first detecting step is perform to obtain a first fluorescent signal 400BS emitted from the bio-samples 400B immobilized on the reaction sites 108 corresponding to the reflective sub-polarizing unit 104A2. In particular, in some embodiments, the front polarizing element 114 is oriented to have a polarizing angle that is 90° shift to the polarizing angle of the reflective sub-polarizing unit 104A2. The bio-sample 400B are irradiated with the polarized excitation light 112' that passes through the front polarizing element 114 and reflecting off the reflective sub-polarizing unit 104A2. The polarized excitation light 112' that reflects off the reflective sub-polarizing unit becomes "a diffracted polarized excitation light 112". Meanwhile, the bio-samples 400A are less irradiated with the polarized excitation light 112' since no polarized excitation light 112' reflects off the reflective sub-polarizing unit 104A1 and no diffracted polarized excitation light 112" reaches the reaction sites 108 where the bio-samples 400A are located. Therefore, weaker fluorescent signal is generated from the bio-samples 400A compared to those generated from the bio-samples 400B, thereby avoiding crosstalk.

According to some embodiments, the diffracted polarized excitation light 112" may be generated by diffraction from the reflective sub-polarizing units in 0-order (in the normal direction to the reflective sub-polarizing unit), in first-order, in second-order, and so on. The diffracted polarized excitation light 112" may generate localized enhancement at the neighboring reaction sites 108 that can be designed to have a specific height. In addition to the polarized excitation light 112', the neighboring reaction sites 108 having the specific height may further receive the diffracted polarized excitation light 112", and thus bio-samples 400B immobilized on these reaction sites 108 may be irradiated by the excitation light with higher intensity. As such, as shown in FIG. 6B, the bio-samples 400B that irradiated with the polarized excitation light 112' and the diffracted polarized excitation light 112" may generate the first fluorescent signal 400BS with higher intensity. The divergent first fluorescent signal 400BS may be focused by the lens 116 to result in greater signal intensity, and then may be detected by the photodetector 120. In contrast, the bio-samples 400A located in the reaction sites 108 corresponding to the reflective sub-polarizing unit 104A1 are not irradiated with the diffracted polarized excitation light 112", thereby generating weak fluorescent signals or even not generating fluorescent signals.

Next, referring to step 308 of FIGS. 6A and 6C, the second detecting step is perform to obtain a second fluorescent signal 400AS emitted from the bio-samples 400A immobilized on the reaction sites 108 corresponding to the reflective sub-polarizing unit 104A1. In particular, in some embodiments, the front polarizing element 114 is oriented to have a polarizing angle that is 90° shift to the polarizing angle of the reflective sub-polarizing unit 104A1. The bio-sample 400A are irradiated with the polarized excitation light 112' that passes through the front polarizing element 114 and the diffracted polarized excitation light 112", thereby generating the second fluorescent signal 400AS. The divergent second fluorescent signal 400AS may be focused by the lens 116 to result in greater signal intensity, and then may be detected by the photodetector 120. Similarly, since the polarized excitation light 112' may pass through the reflective sub-polarizing unit 104A2 and may not reflect off the reflective sub-polarizing unit 104A2, the bio-samples 400B located in the reaction sites 108 corresponding to the reflective sub-polarizing unit 104A2 are not irradiated with the diffracted polarized excitation light 112". Therefore, weak or even no fluorescent signal is generated from the bio-samples 400B, and crosstalk between the neighboring reaction sites 108 may be avoided.

Next, referring to step 310 of FIG. 6A, the first fluorescent signal 400BS and the second fluorescent signal 400AS are combined to obtain a complete fluorescent signal from the bio-samples 400A and 400B, thereby completing the bio-detection. In particular, two images respectively including the first fluorescent signal 400BS and the second fluorescent signal 400AS may be merged followed by analysis of the merged image to obtain a complete fluorescent signal. Alternatively, an image including the first fluorescent signal 400BS and an image including the second fluorescent signal 400AS may be analyzed respectively followed by the combination of the results from two images. The aforementioned image may be analyzed by the presence of fluorescent signals from the bio-samples, or by the fluorescence spectrum of the fluorescent signals to differentiate the different molecules immobilized on the reaction sites 108. Although the sequence of the first detecting step and the second detecting step are described above, it should be understood that the second detecting step may be performed before the first detecting step.

Figure 7:
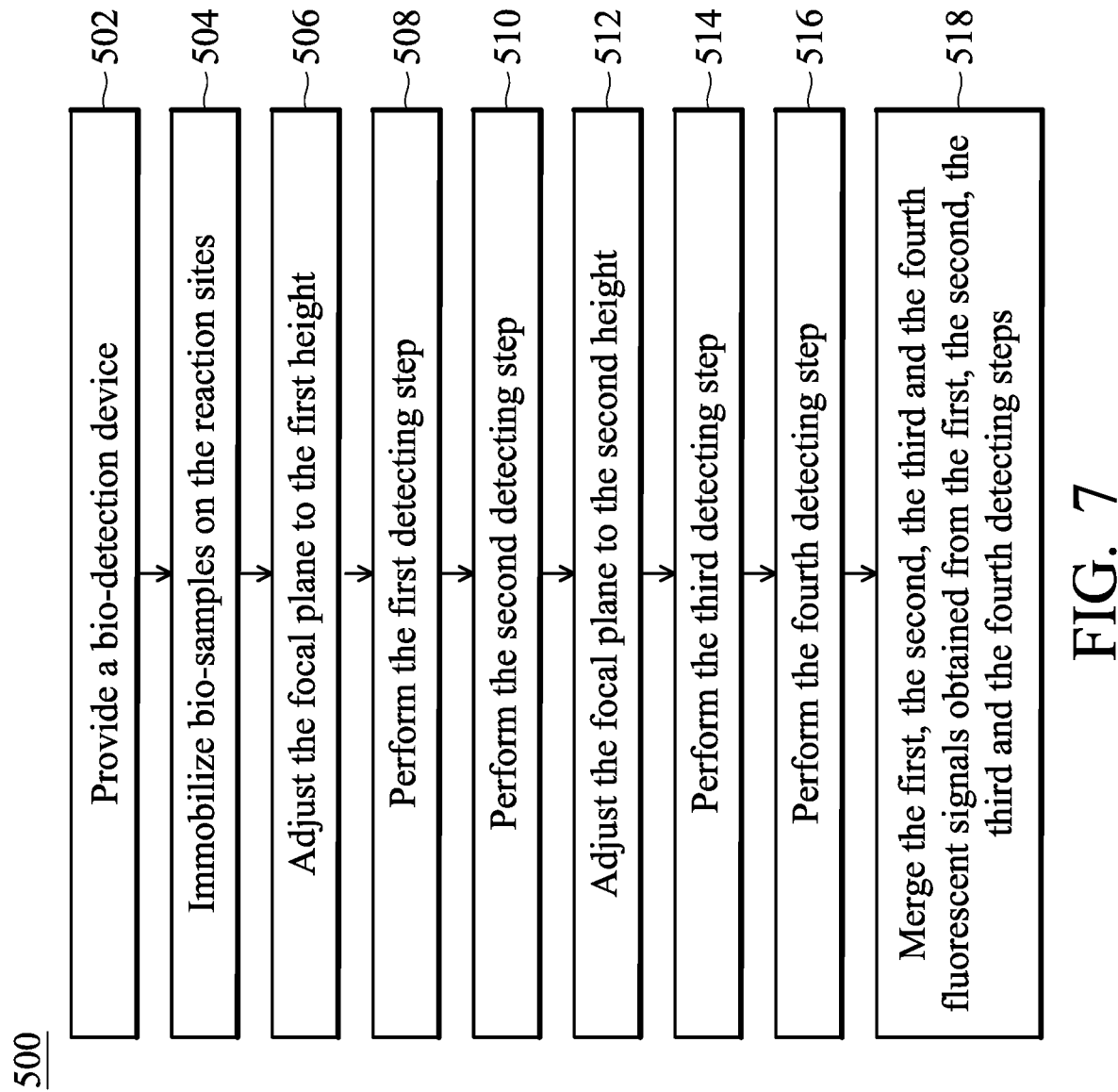
FIG. 7 is a flow diagram of a bio-detection method in accordance with other embodiments.

FIG. 7 is a flow diagram of a bio-detection method 500 in accordance with other embodiments. The bio-detection method 500 in FIG. 7 is similar to the bio-detection method in FIG. 6A, except that the bio-detection method 500 is performed using the bio-detection system 200A in FIG. 3A or the bio-detection system 200C in FIG. 4A. In addition, in these specific embodiments, the lens 116 of the bio-detection system 200A or the lens 126 of the bio-detection device 30 in the bio-detection system 200C is a focus-tunable lens. According to some embodiments, in addition to the first and second detecting steps, the bio-detection method 500 may further include adjusting the focal plane of the focus-tunable lens and performing a third detecting step and a fourth detecting step.

In particular, referring to FIGS. 3A, 4A and 7, before performing the first and second detecting steps 508 and 510, the focal plane of the focus-tunable lens is adjusted (the step 506 in FIG. 7) to the height of the reflective sub-polarizing units 104B1 and 104B2 in order for the photodetector 120 in FIG. 3A or the photodiode 122 in FIG. 4A to obtain clear images captured during the first and second detecting steps 508 and 510.

Subsequently, the first detecting step 508 and the second detecting step 510 are performed to obtain a first fluorescent signal and a second fluorescent signal emitted from the bio-samples immobilized on the reaction sites 108 corresponding to, for example, the reflective sub-polarizing units 104B1 and 104B2, respectively. Specifically, in some embodiments, the first detecting step 508 and the second detecting step 510 may include orienting the front polarizing element 114 so that the front polarizing element 114 can have a polarizing angle that is 90° shift to the polarizing angle of the reflective sub-polarizing units 104B1 and 104B2, respectively. Accordingly, in the first detecting step 508, the bio-samples immobilized on the reaction sites 108 corresponding to the reflective sub-polarizing unit 104B1 may be irradiated, thereby generating the first fluorescent signal. In the second detecting steps 510, the bio-samples immobilized on the reaction sites 108 corresponding to the reflective sub-polarizing unit 104B2 may be irradiated, thereby generating the second fluorescent signal.

After performing the first detecting step 508 and the second detecting step 510, a step 512 in FIG. 7 is performed to adjust the focal plane of the focus-tunable lens to the height of the reflective sub-polarizing units 104A1 and 104A2 in order for the photodetector 120 in FIG. 3A or the photodiode 122 in FIG. 4A to obtain clear images captured during the following third and fourth detecting steps 514 and 516.

Subsequently, the third detecting step 514 and the fourth detecting step 516 are performed to obtain a third fluorescent signal and a fourth fluorescent signal emitted from the bio-samples immobilized on the reaction sites 108 corresponding to, for example, the reflective sub-polarizing units 104A1 and 104A2, respectively. Specifically, in some embodiments, the third detecting step 514 and the fourth detecting step 516 may include orienting the front polarizing element 114 so that the front polarizing element 114 can have a polarizing angle that is 90° shift to the polarizing angle of the reflective sub-polarizing units 104A1 and 104A2, respectively. Accordingly, in the third detecting step 514, the bio-samples immobilized on the reaction sites 108 corresponding to the reflective sub-polarizing unit 104A1 may be irradiated, thereby generating the third fluorescent signal. In the fourth detecting step 516, the bio-samples immobilized on the reaction sites 108 corresponding to the reflective sub-polarizing unit 104A2 may be irradiated, thereby generating the fourth fluorescent signal.

Referring to step 518 of FIG. 7, after completing the first detecting step 508, the second detecting step 510, the third detecting step 514, and the fourth detecting step 516, the first, second, third, and fourth fluorescent signals are combined to obtain a complete fluorescent signal from the bio-samples immobilized on reaction sites 108 corresponding to all of the reflective sub-polarizing units 104A1, 104A2, 104B1, and 104B2 in each pixel unit 100B in FIG. 3A or in each pixel unit 100C in FIG. 4A, thereby completing the bio-detection.

It should be appreciated that, as mentioned above and shown in FIGS. 3A and 4A, the height of the reflective sub-polarizing units 104A1 and 104A2 of the first pair of reflective sub-polarizing units 104A is different from the height of the reflective sub-polarizing units 104B1 and 104B2 of the second pair of reflective sub-polarizing units 104B. Therefore, the steps 506 and 512 in FIG. 7 are adjusting the focal plane of the focus-tunable lens to different heights, and thus a clear image may be captured during each detecting step (step 508, 510, 514, or 516 in FIG. 7).

In addition, according to some embodiments, the bio-detection method may include more than 4 detecting steps, such as 6 detecting steps (not shown), and the bio-detection method may be performed using a bio-detection device whose pixel unit includes 3 pairs of reflective sub-polarizing units (such as the pixel unit 100D shown in FIG. 5A or 5B). Likewise, the bio-detection method may further include adjusting the focal plane of the focus-tunable lens to different heights because the height of each pair of reflective sub-polarizing units is different from one another. By adjusting the focal plane of the focus-tunable lens to a specific height each time, a clear image may be captured during each detecting step and complete bio-information may be obtained with less crosstalk.

In summary, according to some embodiments of the disclosure, each pixel unit of the bio-detection device includes one or more pair of reflective sub-polarizing units. The difference of the absolute value between respective polarizing angles of the reflective sub-polarizing units in each pair of reflective sub-polarizing units is 90°. The reflective sub-polarizing units in the pixel units may induce reflected diffraction points at the reaction sites on which bio-samples are immobilized, thereby realizing localized enhancement to enable the bio-samples at specific diffraction points to generate sufficient emission light (or sufficient fluorescent signals). In addition, according to some embodiments, the bio-detection system includes a front polarizing element that is orientable by rotation to have the same polarizing angle as that of any one of the reflective sub-polarizing units. With such configurations accompanied by a multi-step detecting method, crosstalk between fluorescent signals of neighboring reaction sites may be reduced, and the bio-detection device may be fabricated with higher pixel array density.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A bio-detection device, comprising:
a plurality of pixel units, wherein each of the pixel units comprises:
a substrate;
one or more pairs of reflective sub-polarizing units disposed on the substrate, wherein a difference of the absolute value between respective polarizing angles of the reflective sub-polarizing units in each pair of reflective sub-polarizing units is 90°; and
a plurality of reaction sites defined above the one or more pairs of reflective sub-polarizing units, wherein the reaction sites and the reflective sub-polarizing units are in one-to-one correspondence.

2. The bio-detection device as claimed in claim 1, wherein the reaction sites corresponding to the reflective sub-polarizing units in a same pair of reflective sub-polarizing units have a same height that is measured from top surfaces of the reflective sub-polarizing units to bottom surfaces of the reaction sites.

3. The bio-detection device as claimed in claim 1, wherein the reaction sites corresponding to the reflective sub-polarizing units in different pairs of reflective sub-polarizing units have different heights that are measured from top surfaces of the reflective sub-polarizing units to bottom surfaces of the reaction sites.

4. The bio-detection device as claimed in claim 1, wherein all of the reflective sub-polarizing units of the one or more pairs of reflective sub-polarizing units in each of the pixel units have different respective polarizing angles.

5. The bio-detection device as claimed in claim 1, wherein two of the reflective sub-polarizing units in a same pair of reflective sub-polarizing units have a same grating period.

6. The bio-detection device as claimed in claim 1, wherein the reaction sites are formed as nanowells or nanopatterns.

7. The bio-detection device as claimed in claim 1, wherein the substrate is a transparent substrate.

8. The bio-detection device as claimed in claim 1, wherein each of the pixel units further comprises:
a photodiode embedded in the substrate;
a filter layer disposed on the photodiode; and
a lens disposed between the filter layer and the one or more pairs of reflective sub-polarizing units.

9. The bio-detection device as claimed in claim 8, wherein the lens is a focus-tunable lens.

10. The bio-detection device as claimed in claim 8, wherein each of the pixel units further comprises an optical absorption layer disposed between the filter layer and the lens.

11. A bio-detection system, comprising:
an excitation light source configured to emit an excitation light;
a front polarizing element configured to polarize the excitation light; and
the bio-detection device as claimed in claim 1 configured to receive the polarized excitation light.

12. The bio-detection system as claimed in claim 11, wherein the front polarizing element is orientable by rotation so that the front polarizing element has a polarizing angle that is the same as a polarizing angle of any one of the reflective sub-polarizing units of the one or more pairs of reflective sub-polarizing units in each of the pixel units.

13. The bio-detection system as claimed in claim 11, further comprising:
a lens configured to collect an emission light from a bio-sample immobilized on the reaction sites of the bio-detection device;
a photodetector configured to detect the emission light; and
a filter element configured to filter the excitation light from entering the photodetector.

14. The bio-detection system as claimed in claim 11, further comprising a light splitting element configured to direct the excitation light toward the bio-detection device.

15. A bio-detection method, comprising:
providing the bio-detection system as claimed in claim 11;
immobilizing bio-samples on the reaction sites of the bio-detection device;
performing a first detecting step to obtain a first fluorescent signal emitted from the bio-samples immobilized on the reaction sites corresponding to first reflective sub-polarizing units of first pairs of reflective sub-polarizing units in the pixel units;
performing a second detecting step to obtain a second fluorescent signal emitted from the bio-samples immobilized on the reaction sites corresponding to second reflective sub-polarizing units of the first pairs of reflective sub-polarizing units in the pixel units; and
combining the first fluorescent signal and the second fluorescent signal.

16. The bio-detection method as claimed in claim 15, wherein:
the first detecting step comprises:
orienting the front polarizing element so that the front polarizing element has a polarizing angle that is 90° shift to a polarizing angle of the first reflective sub-polarizing units; and
irradiating the bio-samples immobilized on the reaction sites corresponding to the first reflective sub-polarizing units with the excitation light passing through the front polarizing element and reflecting off the first reflective sub-polarizing units; and
the second detecting step comprises:
orienting the front polarizing element so that the front polarizing element has a polarizing angle that is 90° shift to a polarizing angle of the second reflective sub-polarizing units; and
irradiating the bio-samples immobilized on the reaction sites corresponding to the second reflective sub-polarizing units with the excitation light passing through the front polarizing element and reflecting off the second reflective sub-polarizing units.

17. The bio-detection method as claimed in claim 15, further comprising:
performing a third detecting step to obtain a third fluorescent signal emitted from the bio-samples immobilized on the reaction sites corresponding to third reflective sub-polarizing units of second pairs of reflective sub-polarizing units in the pixel units;
performing a fourth detecting step to obtain a fourth fluorescent signal emitted from the bio-samples immobilized on the reaction sites corresponding to fourth reflective sub-polarizing units of the second pairs of reflective sub-polarizing units in the pixel units; and
combining the first fluorescent signal, the second fluorescent signal, the third fluorescent signal, and the fourth fluorescent signal.

18. The bio-detection method as claimed in claim 17, wherein:
the third detecting step comprises:
orienting the front polarizing element so that the front polarizing element has a polarizing angle that is 90° shift to a polarizing angle of the third reflective sub-polarizing units; and
irradiating the bio-samples immobilized on the reaction sites corresponding to the third reflective sub-polarizing units with the excitation light passing through the front polarizing element and reflecting off the third reflective sub-polarizing units;
the fourth detecting step comprises:
orienting the front polarizing element so that the front polarizing element has a polarizing angle that is 90° shift to a polarizing angle of the fourth reflective sub-polarizing units; and
irradiating the bio-samples immobilized on the reaction sites corresponding to the fourth reflective sub-polarizing units with the excitation light passing through the front polarizing element and reflecting off the fourth reflective sub-polarizing units; and
the polarizing angles of the first, the second, the third, and the fourth reflective sub-polarizing units are different from one another.

19. The bio-detection method as claimed in claim 17, wherein:
each of the pixel units further comprises a focus-tunable lens disposed between the substrate and the one or more pairs of reflective sub-polarizing units;
the bio-detection method further comprises:
adjusting a focal plane of the focus-tunable lens to a first height of the first pairs of reflective sub-polarizing units before performing the first detecting step and the second detecting step, wherein the first height is measured from top surfaces of the first and second reflective sub-polarizing units to bottom surfaces of the reaction sites corresponding to the first and second reflective sub-polarizing units, and
adjusting the focal plane of the focus-tunable lens to a second height of the second pairs of reflective sub-polarizing units between performing the first detecting step and the second detecting step and performing the third detecting step and the fourth detecting step, wherein the second height is measured from top surfaces of the third and fourth reflective sub-polarizing units to bottom surfaces of the reaction sites corresponding to the third and fourth reflective sub-polarizing units; and
the first height is different from the second height.

20. The bio-detection method as claimed in claim 17, wherein:
the bio-detection system further comprises a focus-tunable lens configured to collect an emission light from the bio-samples immobilized on the reaction sites of the bio-detection device;
the bio-detection method further comprises:
adjusting a focal plane of the focus-tunable lens to a first height of the first pairs of reflective sub-polarizing units before performing the first detecting step and the second detecting step, wherein the first height is measured from top surfaces of the first and second reflective sub-polarizing units to bottom surfaces of the reaction sites corresponding to the first and second reflective sub-polarizing units, and
adjusting the focal plane of the focus-tunable lens to a second height of the second pairs of reflective sub-polarizing units between performing the first detecting step and the second detecting step and performing the third detecting step and the fourth detecting step, wherein the second height is measured from top surfaces of the third and fourth reflective sub-polarizing units to bottom surfaces of the reaction sites corresponding to the third and fourth reflective sub-polarizing units; and
the first height is different from the second height.

* * * * *